United States Patent
Negoro

(10) Patent No.: US 9,971,883 B2
(45) Date of Patent: May 15, 2018

(54) INFORMATION PROCESSING DEVICE TO INSTALL APPLICATIONS USING INSTALLATION SCREEN ASSOCIATED WITH A USER

(71) Applicant: Shigeo Negoro, Tokyo (JP)

(72) Inventor: Shigeo Negoro, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 110 days.

(21) Appl. No.: 14/944,709

(22) Filed: Nov. 18, 2015

(65) Prior Publication Data

US 2016/0149885 A1    May 26, 2016

(30) Foreign Application Priority Data

Nov. 20, 2014   (JP) .................................. 2014-235914
Jun. 1, 2015    (JP) .................................. 2015-111613

(51) Int. Cl.
*G06F 21/00* (2013.01)
*G06F 21/30* (2013.01)
(Continued)

(52) U.S. Cl.
CPC ............ *G06F 21/30* (2013.01); *G06F 3/0482* (2013.01); *G06F 8/61* (2013.01); *G06F 21/31* (2013.01);
(Continued)

(58) Field of Classification Search
None
See application file for complete search history.

(56) References Cited

U.S. PATENT DOCUMENTS

2010/0073160 A1\* 3/2010 Gilmour ............ G06F 3/04817
                                                            340/540
2010/0293491 A1    11/2010 Kawai
(Continued)

FOREIGN PATENT DOCUMENTS

JP    2011-237881    11/2011
JP    2013-191196    9/2013

OTHER PUBLICATIONS

Extended European Search Report dated May 4, 2016 in Patent Application No. 15195385.8.

*Primary Examiner* — Hadi Armouche
*Assistant Examiner* — Andrew Steinle
(74) *Attorney, Agent, or Firm* — Oblon, McClelland, Maier & Neustadt, L.L.P.

(57) ABSTRACT

An information processing device includes: an authentication unit configured to compare, when receiving first user information used for authentication processing of determining whether a user has authority to use the information processing device, the first user information with second user information identifying users having the authority to use the information processing device, and execute the authentication processing; a first storage unit storing first association information in which installation screen information identifying an installation screen for installation of an application is associated with each piece of the second user information; and a second display unit configured to generate, based on a command associated with an application selected by a user among an application displayed by a first display unit, an installation screen identified by installation screen information which is associated with second user information identifying the user, and display the installation screen.

8 Claims, 18 Drawing Sheets

(51) Int. Cl.
  *H04L 29/06* (2006.01)
  *G06F 9/445* (2018.01)
  *G06F 21/31* (2013.01)
  *G06F 21/57* (2013.01)
  *G06F 3/0482* (2013.01)

(52) U.S. Cl.
  CPC .............. *G06F 21/57* (2013.01); *H04L 63/08* (2013.01); *H04L 63/20* (2013.01)

(56) References Cited

U.S. PATENT DOCUMENTS

| | | |
|---|---|---|
| 2011/0222100 A1 | 9/2011 | Tanaka |
| 2011/0276960 A1 | 11/2011 | Nakamoto |
| 2012/0129503 A1* | 5/2012 | Lindeman ............... G06F 3/048 455/414.1 |
| 2013/0091452 A1* | 4/2013 | Sorden .................... G06F 3/048 715/771 |
| 2013/0114095 A1* | 5/2013 | Akiyoshi ................. G06F 8/60 358/1.13 |
| 2013/0132941 A1 | 5/2013 | Lindeman et al. |
| 2013/0219260 A1 | 8/2013 | Hirokawa |
| 2013/0347097 A1* | 12/2013 | Pan ........................ G06F 21/31 726/17 |
| 2014/0016159 A1 | 1/2014 | Tanaka |
| 2014/0162614 A1 | 6/2014 | Lindeman et al. |
| 2015/0133094 A1 | 5/2015 | Lindeman et al. |

* cited by examiner

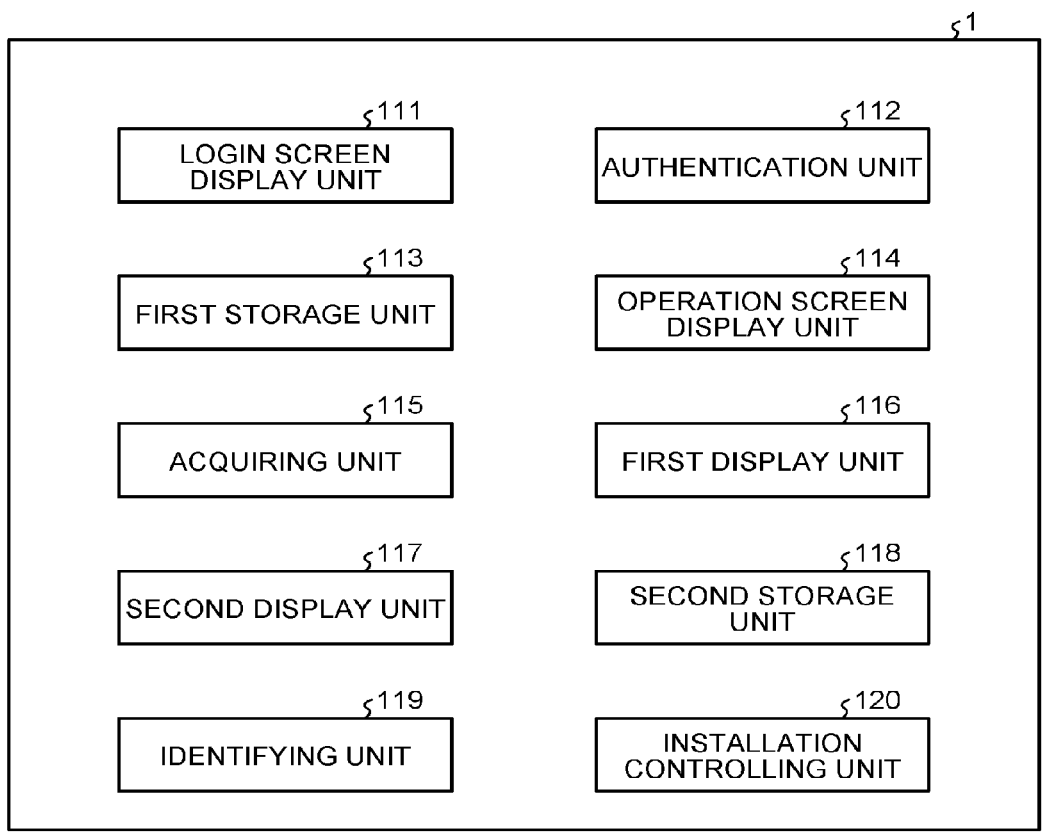

installer_install:///id=49354

| APPLICATION IDENTIFICATION INFORMATION | APPLICATION SERVER IDENTIFICATION INFORMATION |
|---|---|
| 49354 | AAAA1 |
| 48251 | AAAA2 |
| 51354 | BBBB1 |
| ⋮ | ⋮ |

| APPLICATION IDENTIFICATION INFORMATION | FIRST DESTINATION INFORMATION | APPLICATION SERVER IDENTIFICATION INFORMATION |
|---|---|---|
| 49354 | JP | AAAA1 |
| 49354 | US | AAAA5 |
| 49354 | CN | AAAA3 |
| ⋮ | ⋮ | ⋮ |
| 51354 | JP | BBBB1 |
| 51354 | US | BBBB7 |
| ⋮ | ⋮ | ⋮ |

```
<ApplicationList>
  <Application>
    <Name>application</Name>   ←— APP NAME
    <install="false">
    <condition>
    <destination>JP</destination>   ←— SECOND DESTINATION INFORMATION
      ⋮
  <Application>
    <Name>application2</Name>   ←— APP NAME
    <install="false">
    <condition>
    <destination>US</destination>   ←— SECOND DESTINATION INFORMATION
      ⋮
```

INFORMATION PROCESSING DEVICE TO INSTALL APPLICATIONS USING INSTALLATION SCREEN ASSOCIATED WITH A USER

CROSS-REFERENCE TO RELATED APPLICATIONS

The present application claims priority to and incorporates by reference the entire contents of Japanese Patent Application No. 2014-235914 filed in Japan on Nov. 20, 2014 and Japanese Patent Application No. 2015-111613 filed in Japan on Jun. 1, 2015.

BACKGROUND OF THE INVENTION

1. Field of the Invention

The present invention relates to an information processing device, an information processing system, and an information processing method.

2. Description of the Related Art

Conventionally, a system to download and install an application from a web page provided by a web server has been known.

For example, in Japanese Patent Laid-open Patent Publication No. 2011-237881, a configuration in which an MFP downloads and installs software while working together with a distribution server, which distributes the software, is disclosed.

However, in a technique disclosed in Japanese Laid-open Patent Publication No. 2011-237881, there is a problem that it is not possible to generate and display an installation screen in a device which installs an application and that it is not possible to switch an installation screen according to a user (in a form suitable to user).

In view of the forgoing, there is a need to provide an information processing device, an information processing system, and an information processing method with which it is possible to switch an installation screen according to a user.

SUMMARY OF THE INVENTION

It is an object of the present invention to at least partially solve the problems in the conventional technology.

An information processing device includes: an authentication unit configured to compare, when receiving first user information used for authentication processing of determining whether a user has authority to use the information processing device, the first user information with second user information identifying users having the authority to use the information processing device, and execute the authentication processing; a first storage unit storing first association information in which installation screen information identifying an installation screen for installation of an application is associated with each piece of the second user information; an acquiring unit configured to acquire an application list screen in which a command to display an installation screen is associated with each application; a first display unit configured to display the application list screen; and a second display unit configured to generate, based on a command associated with an application selected by a user among an application displayed on the application list screen, an installation screen identified by installation screen information which is associated with second user information identifying the user, and display the installation screen.

An information processing system includes an information processing device and a server. The server includes at least a holding unit configured to hold an application list screen in which a command to display an installation screen for installation of each application is associated with that application. The information processing device includes: an authentication unit configured to compare, when receiving first user information used for authentication processing of determining whether a user has authority to use the information processing device, the first user information with second user information identifying users having the authority to use the information processing device, and to execute the authentication processing; a first storage unit configured to store first association information in which installation screen information identifying an installation screen is associated with each piece of the second user information; an acquiring unit configured to acquire the application list screen from the server; a first display unit configured to display the application list screen; and a second display unit configured to generate, based on a command associated with an application selected by a user among one or more applications displayed on the application list screen, an installation screen identified by installation screen information associated with second user information identifying the user, and displays the installation screen.

An information processing method includes: authenticating including comparing, when receiving first user information used for authentication processing of determining whether a user has authority to use an information processing device, the first user information with second user information identifying users having the authority to use the information processing device, and executing the authentication processing; acquiring an application list screen in which a command to display an installation screen for installation of each application is associated with that application; first displaying the application list screen; and second displaying including generating, based on a command associated with an application selected by a user among one or more applications displayed on the application list screen, an installation screen identified by installation screen information associated with second user information identifying the user among installation screen information which is included in first association information in which installation screen information identifying an installation screen is associated with each piece of the second user information, and displaying the installation screen.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a block diagram illustrating an example of a functional configuration of an MFP of a first embodiment;

FIG. 5 is a view illustrating an example of first association information;

DETAILED DESCRIPTION OF THE PREFERRED EMBODIMENTS

In the following, embodiments of an information processing device, an information processing system, and an information processing method according to the present invention will be described in detail with reference to the attached drawings. In the following, a multifunction peripheral (MFP) which is one form of an image forming device will be described as an example of the information processing device according to the present invention, but it is not limited thereto. Note that the multifunction peripheral is a device including a plurality of different functions such as a copy function, a scanner function, a printing function, and a fax function.

First Embodiment

Figure 1:
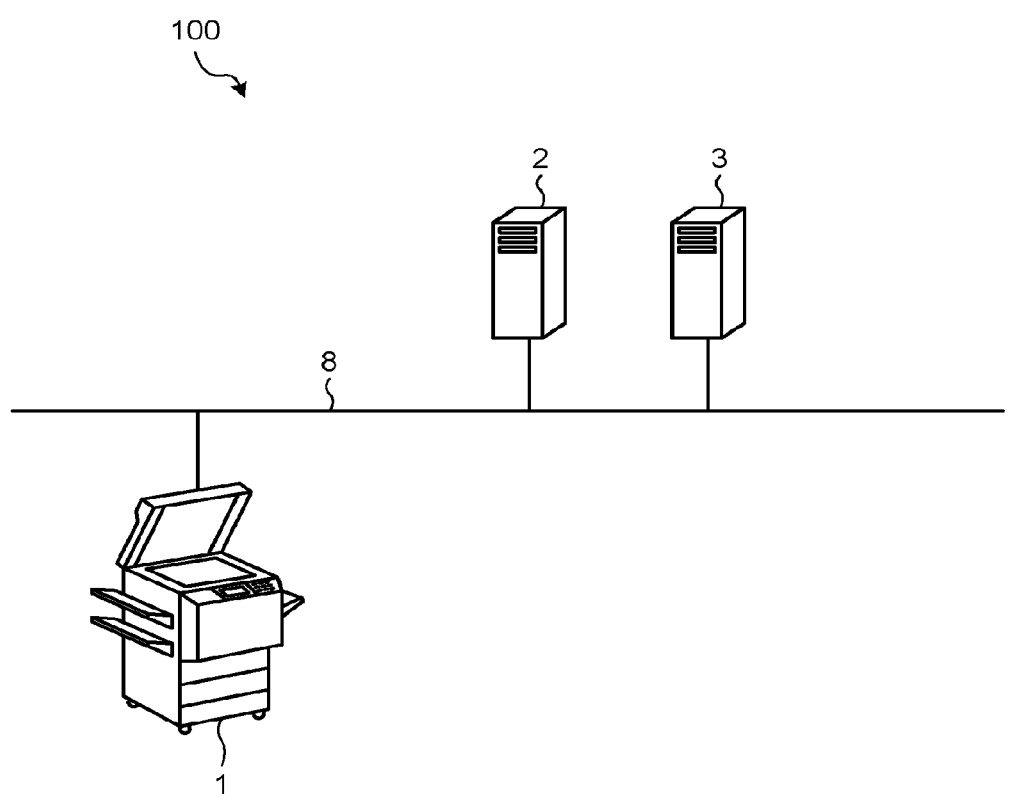
FIG. 1 is a view illustrating an example of a schematic configuration of an information processing system.

FIG. 1 is a view illustrating an example of a schematic configuration of an information processing system 100 of the present embodiment. As illustrated in FIG. 1, the information processing system 100 includes an MFP 1, a web server 2, and an application server 3 which are connected to each other through a network 8. Note that for convenience of description, only one MFP 1 is illustrated as an example of a device included in the information processing system 100 in FIG. 1, but it is not limited thereto. The number of devices included in the information processing system 100 and a kind of the devices are arbitrarily determined.

The web server 2 provides, to the MFP 1, an application list screen (may be referred to as "app store" in the following description) in which a command to display an installation screen for installation of each application is associated with that application. Detail contents will be described later. In this example, an application to provide a function of acquiring an app store from the web server 2 and of displaying the app store on the MFP 1 (which application may be referred to as "store app" in the following) or an application to provide a function of displaying an installation screen (described later) to install an application selected by a user among applications displayed on the app store and of performing control to install the application through the installation screen (such as control to download and install application into MFP 1) (which application may be referred to as "installation application" in the following) is installed into the MFP 1. Note that a function of the store app is realized by utilization of an application to provide a function of a web browser. Thus, the store app may be collectively referred to as a "browser app." Detail contents of the MFP 1 will be described later.

The application server 3 holds an application displayed on the application list screen. Note that for convenience of description, only one application server 3 is illustrated as an example of that included in the information processing system 100 in FIG. 1, but it is not limited thereto. The number of application servers 3 included in the information processing system 100 is arbitrarily determined.

Figure 2:
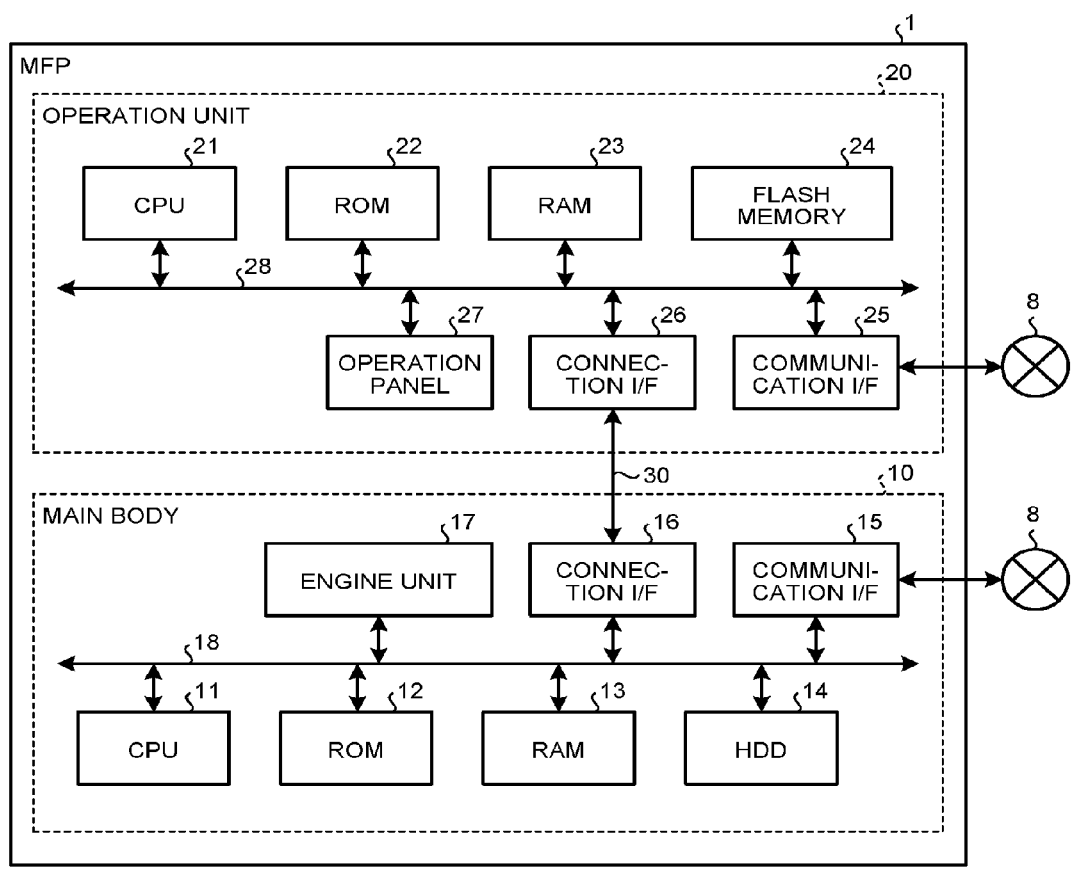
FIG. 2 is a view illustrating an example of a hardware configuration of an MFP.

Next, a hardware configuration of the MFP 1 will be described with reference to FIG. 2. As illustrated in FIG. 2, the MFP 1 includes a main body 10 which can realize various functions such as a copy function, a scanner function, a fax function, and a printer function and an operation unit 20 to receive operation of a user. Note that in a concept of receiving operation of a user, receiving information (including signal or the like indicating coordinate value on screen) which is input according to operation by a user is included. The main body 10 and the operation unit 20 are connected to each other through a special channel 30. As the channel 30, what is compliant with a universal serial bus (USB) standard can be used, for example. The channel 30 may be what is compliant with an arbitrary wired or wireless standard.

Note that the main body 10 can perform an operation corresponding to the operation received in the operation unit 20. Also, the main body 10 can communicate with an external device such as a client personal computer (PC) and can perform an operation according to an instruction received from the external device.

First, a hardware configuration of the main body 10 will be described. As illustrated in FIG. 2, the main body 10 includes a CPU 11, a ROM 12, a RAM 13, a hard disk drive (HDD) 14, a communication interface (I/F) 15, a connection I/F 16, and an engine unit 17 which are connected to each other through a system bus 18.

The CPU 11 integrally controls an operation of the main body 10. By executing a program stored in the ROM 12, the HDD 14, or the like with the RAM 13 as a work area (workspace), the CPU 11 controls an operation of the entire main body 10 and realizes various functions such as the copy function, the scanner function, the fax function, and the printer function.

The communication I/F 15 is an interface for connection with the network 8. The connection I/F 16 is an interface for communication with the operation unit 20 through the channel 30.

The engine unit 17 is hardware to perform processing, other than general information processing and communication, to realize the copy function, the scanner function, the fax function, and the printer function. For example, a scanner (image reading unit) to read an image of a document by scanning, a plotter (image forming unit) to perform printing onto a sheet material such as paper, or a fax unit to perform fax communication is included. Also, a specific option such as a finisher to sort printed sheet material or an automatic document feeding device (ADF) to perform automatic feeding of a document may be included.

Next, a hardware configuration of the operation unit 20 will be described. As illustrated in FIG. 2, the operation unit 20 includes a CPU 21, a ROM 22, a RAM 23, a flash memory 24, a communication I/F 25, a connection I/F 26, and an operation panel 27 which are connected to each other through a system bus 28.

The CPU 21 integrally controls an operation of the operation unit 20. By executing a program stored in the ROM 22, the flash memory 24, or the like with the RAM 23 as a work area (workspace), the CPU 21 controls the operation of the entire operation unit 20 and realizes various functions (described later) such as displaying of information (image) according to an input received from a user.

The communication I/F 25 is an interface for connection with the network 8. The connection I/F 26 is an interface for communication with the main body 10 through the channel 30.

The operation panel 27 receives various inputs according to operation of a user and displays various kinds of information (such as information according to received operation, information indicating operation condition of MFP 1, and information indicating setting state). In this example, the operation panel 27 includes a liquid crystal display device (LCD) with a touch panel function, but it is not limited thereto. For example, an organic EL display device including a touch panel function may be included. Also, in addition to or instead of this, an operation unit such as a hardware key or a display unit such as a lamp may be provided.

Figure 3:
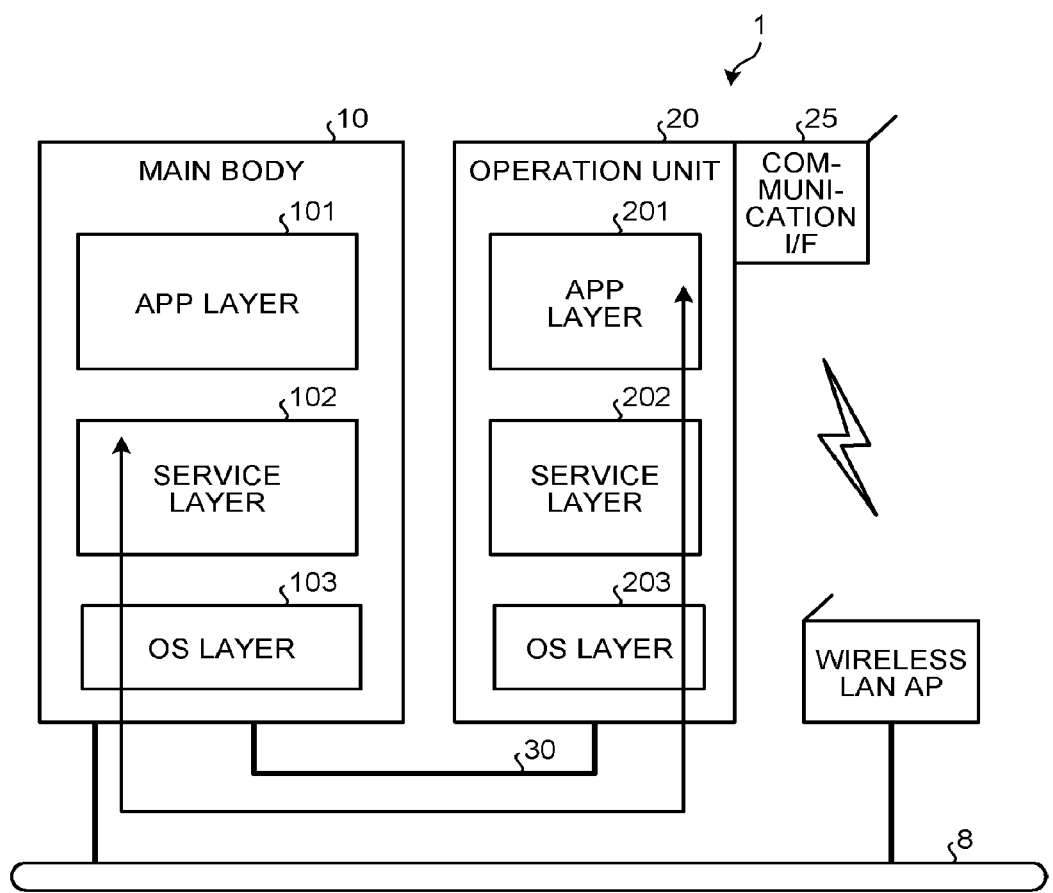
FIG. 3 is a view illustrating an example of a software configuration of the MFP.

Next, a software configuration of the MFP 1 will be described. FIG. 3 is a schematic view illustrating an example of a software configuration of the MFP 1. As illustrated in FIG. 3, the main body 10 includes an app layer 101, a service layer 102, and an OS layer 103. The app layer 101, the service layer 102, and the OS layer 103 are various kinds of software included in the ROM 12, the HDD 14, or the like. The CPU 11 executes these kinds of software, whereby various functions are provided.

Software in the app layer 101 is application software (may be simply referred to as "app" in the following description) to operate a hardware resource and to provide a predetermined function. Examples of an app include a copy app to provide a copy function, a scanner app to provide a scanner function, a fax app to provide a fax function, and a printer app to provide a printer function.

Software in the service layer 102 is software which is provided between the app layer 101 and the OS layer 103 and which is to provide, to an app, an interface to use a hardware resource included in the main body 10. More specifically, the software is software to receive an operation request with respect to the hardware resource and to provide a function to arbitrate the operation request. As the operation request received in the service layer 102, a request for reading by the scanner or for printing by the plotter is conceivable.

Note that the function of the interface which function is provided by the service layer 102 is provided not only to the app layer 101 of the main body 10 but also to an app layer 201 of the operation unit 20. That is, the app layer 201 (app) of the operation unit 20 can also realize a function using a hardware resource (such as engine unit 17) of the main body 10 through the interface function of the service layer 102.

Software in the OS layer 103 is basic software (operating system (OS)) to provide a basic function to control hardware included in the main body 10. Software in the service layer 102 converts a request for utilization of a hardware resource from each of various applications into a command, which can be interpreted by the OS layer 103, and transmits the command to the OS layer 103. Then, the command is executed by the software of the OS layer 103, whereby the hardware resource performs an operation according to a request from the app.

Similarly, the operation unit 20 includes the app layer 201, a service layer 202, and an OS layer 203. A hierarchical structure of the app layer 201, the service layer 202, and the OS layer 203 included in the operation unit 20 is similar to that in the main body 10. However, a function provided by an app in the app layer 201 or a kind of an operation request, which can be received in the service layer 202, is different from that in the main body 10. The app in the app layer 201 may be software to provide a predetermined function by operating a hardware resource included in the operation unit 20. However, the app is mainly software to provide a function of a user interface (UI) to perform an operation or a display related to a function (copy function, scanner function, fax function, or printer function) included in the main body 10. The app in the app layer 201 also includes a browser app (store app) and an installation application.

Note that in the present embodiment, the software in the OS layer 103 in the main body 10 and the software in the OS layer 203 in the operation unit 20 are different from each other in order to keep independency of a function. That is, the main body 10 and the operation unit 20 operate independently by different operating systems. For example, it is possible that Linux (registered trademark) is used as the software in the OS layer 103 in the main body 10 and Android (registered trademark) is used as software in the OS layer 203 in the operation unit 20.

As described above, in the MFP 1 of the present embodiment, the main body 10 and the operation unit 20 is operated by different operating systems. Thus, communication between the main body 10 and the operation unit 20 is performed not as interprocess communication in a common device but as communication between different devices. An operation (command communication) to transmit information received by the operation unit 20 (contents of instruction from user) to the main body 10 and an operation by the main body 10 to notify the operation unit 20 of an event correspond to this. Here, the operation unit 20 performs command communication with respect to the main body 10, whereby a function of the main body 10 can be used. The event of which the operation unit 20 is notified from the main body 10 is, for example, an execution condition of an operation in the main body 10 or contents set in the main body 10.

Because power is supplied to the operation unit 20 from the main body 10 through the channel 30 in the present embodiment, it is possible to perform power supply control of the operation unit 20 separately (independently) from power supply control of the main body 10.

Next, a functional configuration of the MFP 1 will be described. FIG. 4 is a block diagram illustrating an example of the functional configuration of the MFP 1. As illustrated in FIG. 4, the MFP 1 includes a login screen display unit 111, an authentication unit 112, a first storage unit 113, an operation screen display unit 114, an acquiring unit 115, a first display unit 116, a second display unit 117, a second storage unit 118, an identifying unit 119, and an installation controlling unit 120. For convenience of description, a function according to the present invention is mainly illustrated as an example in FIG. 4. However, a function included in the MFP 1 is not limited thereto.

The login screen display unit 111 displays, on the operation panel 27, a login screen to prompt an input of first user information used for authentication processing to determine whether a user has authority to use the MFP 1 and receives an input of the first user information. For example, the first user information may include a combination of a user name and a password but it is not limited thereto.

When the first user information is received (when input of first user information is received in login screen display unit 111), the authentication unit 112 compares the first user information with second user information identifying users with authority to use the MFP 1 and executes authentication processing. Then, the authentication unit 112 notifies the operation screen display unit 114 described later of a result of the authentication processing. Here, the authentication processing is processing to determine that a user who inputs first user information has authority to use the MFP 1, when the first user information matches the second user information, and to determine that a user who inputs first user information does not have authority to use the MFP 1 when the first user information does not match the second user information.

The first storage unit 113 stores first association information in which installation screen information identifying an installation screen used for installation of an application is associated with each piece of second user information. FIG. 5 is a view illustrating an example of first association information. In the example illustrated in FIG. 5, the second user information includes a combination of a user name and a password, but it is not limited thereto. Note that here, more-detailed authority is set with respect to each user with authority to use the MFP 1. The detailed authority can be set individually with respect to each user and various forms thereof are conceivable. For example, authority to perform operation which is not permitted to a general user can be set with respect to a serviceman for maintenance/management of software and authority to use an installation screen described later can be set with respect to a general user (however, authority to use installation screen described later may be not set depending on a user). With the second user information identifying a user without authority to use an installation screen described later, information indicating that there is no installation screen to be displayed may be associated as installation screen information.

Also, for example, the first association information may be information in which authority information identifying authority of a user and installation screen information are associated with each piece of the second user information. In this example, installation screen information associated with the second user information varies depending on authority information. Also, for example, the first association information may include information indicating an association relation between the second user information and the authority information and information indicating an association relation between the authority information and the installation screen information. That is, the first association information only needs to be information in which the installation screen information identifying an installation screen is associated with each piece of the second user information identifying users with authority to use the MFP 1.

Figure 6:
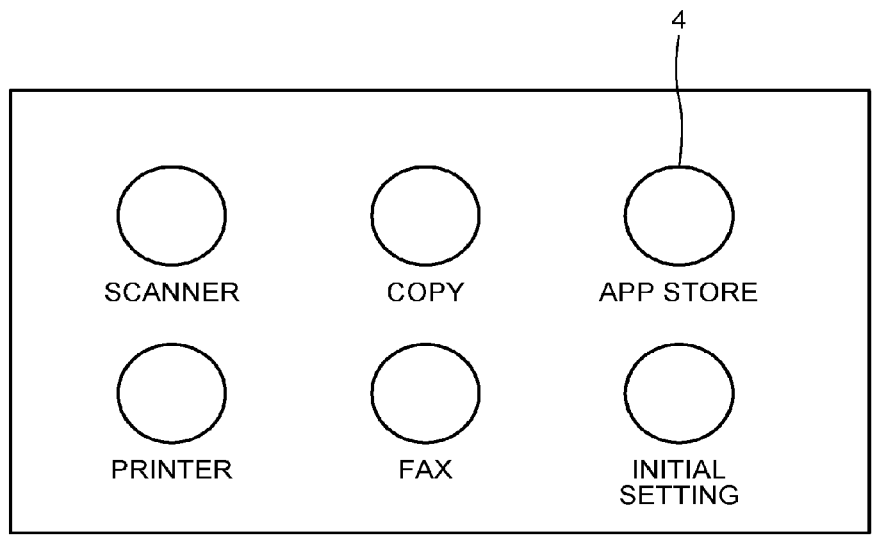
FIG. 6 is a view illustrating an example of an operation screen.

The operation screen display unit 114 performs control to display an operation screen, on which various kinds of operation are performed, onto the operation panel 27. More specifically, the operation screen display unit 114 performs control to display an operation screen illustrated in FIG. 6 onto the operation panel 27 when receiving notification indicating that a user is authenticated by the authentication unit 112. The operation screen display unit 114 does not perform control to display the operation screen onto the operation panel 27 and performs control to display, for example, a screen indicating that authentication is failed onto the operation panel 27 when receiving notification indicating that a user is not authenticated. FIG. 6 is a view illustrating an example of the operation screen and an icon 4 to activate a store app is displayed on the operation screen.

A description of FIG. 4 is continued. The acquiring unit 115 acquires an application list screen (app store) in which a command to display an installation screen for installation of each application is associated with that application. In this example, the web server 2 corresponds to a "server" in claims. In the present embodiment, when a user touches the icon 4, the store app is activated and the store app (acquiring unit 115) transmits, to the web server 2, a signal to request an app store (hereinafter, which signal may be referred to as "app store request"). Then, an app store is acquired from the web server 2 as the response.

Figure 7:
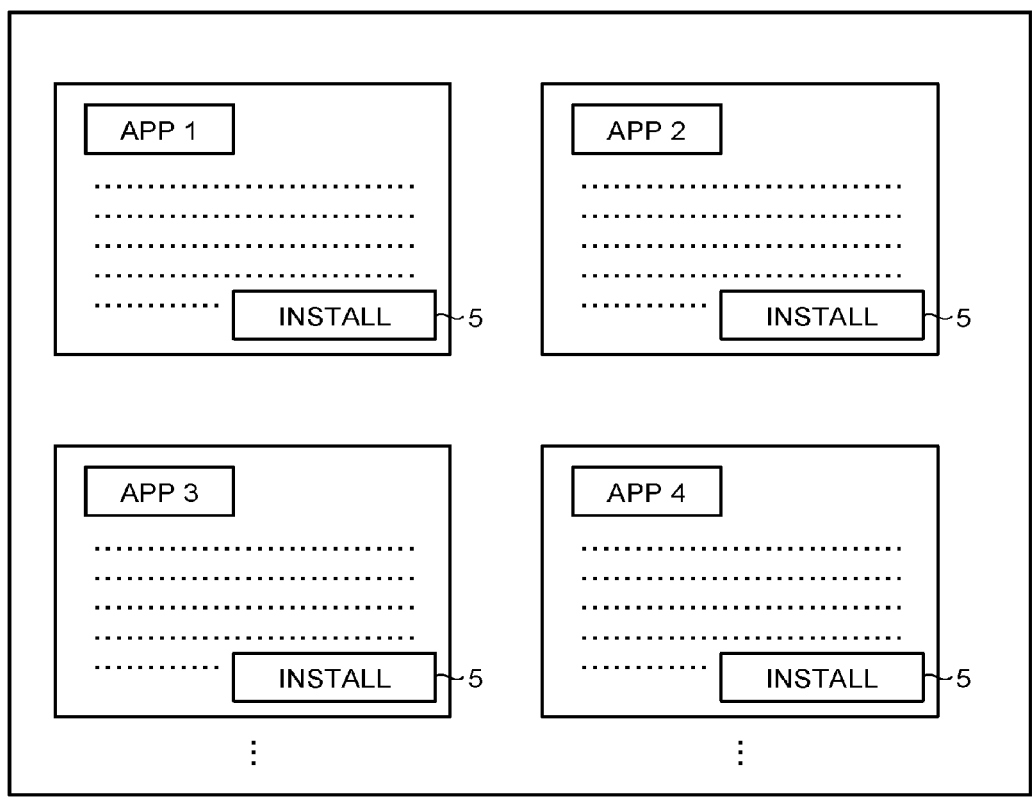
FIG. 7 is a view illustrating an example of an app store.
Figures 8, 9:
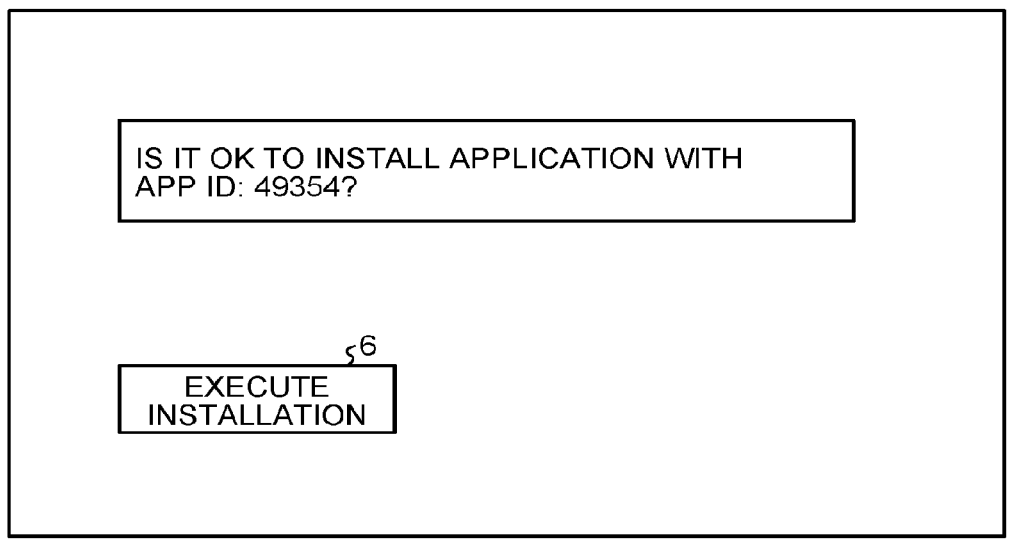
FIG. 8 is a view illustrating an example of an installation command.
FIG. 9 is a view illustrating an example of an installation screen.

FIG. 7 is a view illustrating an example of the app store (web page). In the example in FIG. 7, in the app store, description information to describe, with respect to each of applications which can be provided, contents of that application and a button 5 (which is button 5 for instruction for installation of an application in this example and which is referred to as "installation button 5" in the following) to instruct installation of that application are displayed. In this example, with respect to each installation application, a command to install an application (hereinafter, referred to as "installation command") is attached, in a format of a URI (may be format of URL or the like), to the installation button 5 corresponding to the application. FIG. 8 is a view illustrating an example of an installation command attached to an installation button 5 corresponding to an application identified by an app ID "49354" and indicates a command to install the application identified by the app ID "49354."

A description of FIG. 4 is continued. The first display unit 116 displays an application list screen. In this example, the first display unit 116 displays the app store acquired by the acquiring unit 115 onto the operation panel 27.

Based on a command associated with an application selected by a user among an application displayed on the application list screen, the second display unit 117 generates an installation screen identified by the installation screen information associated with the second user information identifying the user and displays the screen. In this example, based on an installation command attached to the installation button 5 pressed by the user, the second display unit 117 generates an installation screen identified by installation screen information associated with the second user information identifying the user and displays the screen. Here, it is possible to interpret that an installation command is a command to display an installation screen. Also, here, operation to press the installation button 5 performed by a user can be interpreted as operation to select an application corresponding to the installation button 5 which operation is performed by the user.

In the present embodiment, the second display unit 117 inquires, of the authentication unit 112, installation screen information associated with second user information identifying a currently-authenticated user (that is, user who presses installation button 5) when the installation button 5 of any of the applications in the app store is pressed, and acquires the installation screen information from the authentication unit 112. Then, the second display unit 117 generates an installation screen identified by the installation screen information and displays the screen onto the operation panel 27.

FIG. 9 is a view illustrating an example of the installation screen. In this example, on the installation screen, at least a button 6 to instruct installation (may be referred to as "installation execution button 6" in the following description) is displayed. Here, for example, installation screen information identifying a simple installation screen for quick installation is associated with second user information identifying a serviceman and installation screen information identifying an installation screen with more pieces of information, which is related to installation, than the installation screen for the serviceman is associated with second user information identifying a general user, whereby an installation screen suitable to a user who presses the installation button 5 is displayed.

Figures 10, 11:
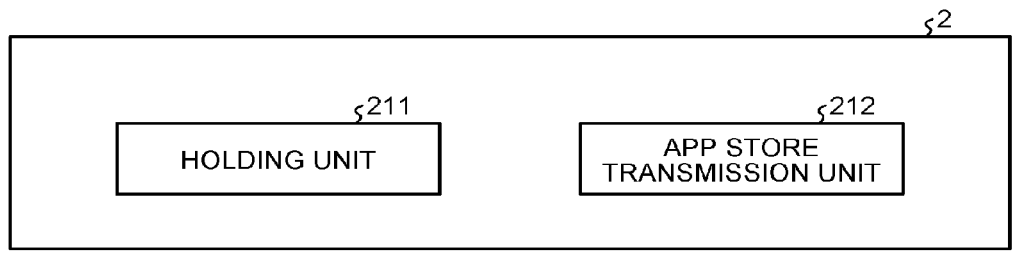
FIG. 10 is a view illustrating an example of second association information of the first embodiment.
FIG. 11 is a view illustrating an example of a functional configuration of a web server.

A description of FIG. 4 is continued. The second storage unit 118 stores second association information in which application server identification information identifying the application server 3 holding an application is associated with each piece of application identification information identifying that application. FIG. 10 is a view illustrating an example of the second association information. When receiving an instruction to install an application through the installation screen, the identifying unit 119 identifies the application server 3 associated with the application based on the second association information. In the present embodiment, when the installation execution button 6 on the installation screen is pressed, the identifying unit 119 refers to the second association information stored in the second storage unit 118 and identifies application server identification information associated with application identification information identifying the application corresponding to the installation screen.

With an application server 3 identified by the application server identification information identified by the identifying unit 119, the installation controlling unit 120 performs control to install an application held by the application server 3. In this example, the installation controlling unit 120 performs control to download the application held by the application server 3 from the application server 3 identified by the application server identification information identified by the identifying unit 119 and to install the application into the MFP 1, but it is not limited thereto. For example, when the application held by the application server 3 is a web app indicating an application used through a network, the installation controlling unit 120 may access the application server 3, download an application necessary for using the web app, and install the application into the MFP 1 instead of downloading the web app itself from the application server 3.

Next, a functional configuration of the web server 2 will be described with reference to FIG. 11. As illustrated in FIG. 11, the web server 2 includes a holding unit 211 and an app store transmission unit 212. For convenience of description, in FIG. 11, a function related to the present invention is mainly illustrated as an example. However, the function included in the web server 2 is not limited to this.

The holding unit 211 holds the above-described app store. When receiving the above-described app store request from the MFP 1, the app store transmission unit 212 transmits the app store held in the holding unit 211 to the MFP 1 as the response.

Note that the web server 2 of the present embodiment has a hardware configuration of a general computer including a CPU, a ROM, a RAM, and the like. A function of the above-described app store transmission unit 212 is realized when the CPU executes a program stored in the ROM or the like, but it is not limited thereto. For example, the function may be realized by a special hardware circuit (such as semiconductor integrated circuit). The above-described holding unit 211 is realized by a ROM, a RAM, or the like.

Figure 12:
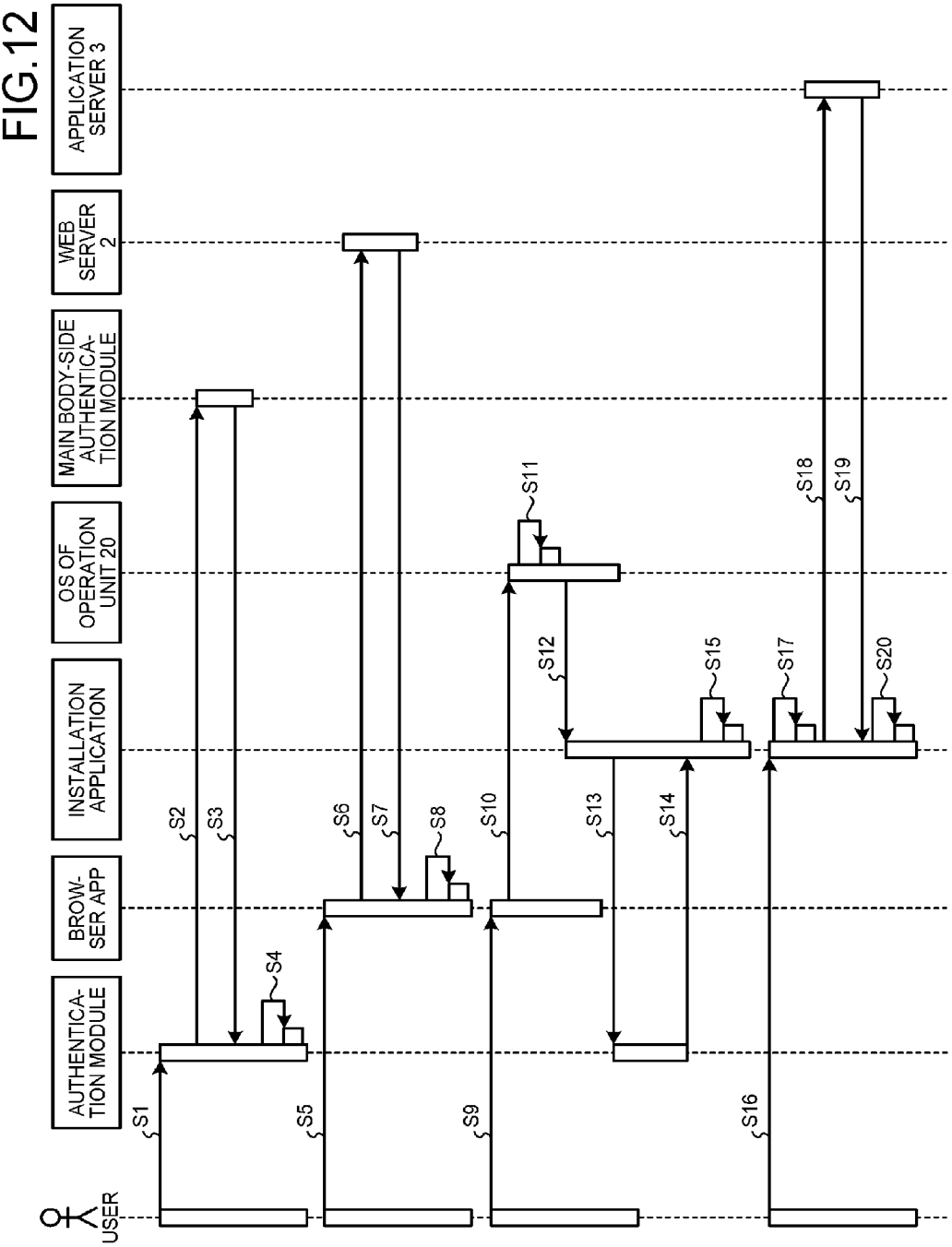
FIG. 12 is a sequence diagram illustrating an example of an operation procedure of an information processing system of the first embodiment.

FIG. 12 is a sequence diagram illustrating an example of an operation procedure of the information processing system 100 of the present embodiment. Also, on the operation panel 27, the above-described login screen is displayed. When a user inputs first user information (such as a user name and password) on the login screen (step S1), an authentication module to manage authentication in the operation unit 20 requests an authentication module in the main body, which module manages authentication in the main body 10, to check whether there is second user information matching the first user information (step S2). As the response, a result of the authentication processing is received (step S3) and a screen corresponding to the result of the authentication processing is displayed (step S4). For example, when the result of the authentication processing is affirmative, the operation screen illustrated in FIG. 6 is displayed on the operation panel 27 and when the result of the authentication processing is negative, an error screen indicating that authentication is not established (that utilization of MFP 1 is not permitted) is displayed onto the operation panel 27. In the following, description will be made on the assumption that the result of the authentication processing is affirmative.

Next, when the user (currently-authenticated user) touches the icon 4 (see FIG. 6) on the operation screen (step S5), the browser app transmits the above-described app store request to the web server 2 (step S6). As the response, the app store is received from the web server 2 (step S7) and the received app store is displayed onto the operation panel 27 (step S8).

Then, when the user presses the installation button 5 of any of the applications on the app store (step S9), the browser app notifies the OS of the operation unit 20 of an installation command, which is attached to the installation button 5 (step S10). The OS of the operation unit 20 checks the installation command in the notification (step S11) and broadcasts the installation command to applications of the operation unit 20 (step S12).

Then, the installation application responds to the broadcast installation command, inquires, of the authentication module, installation screen information associated with second user information identifying the currently-authenticated user (step S13), and acquires the installation screen information from the authentication module (step S14). Then, the installation application generates an installation screen identified by the installation screen information acquired in step S14 and displays the screen onto the operation panel 27 (step S15).

Then, when the user presses the installation execution button 6 on the installation screen (step S16), the installation application refers to the above-described second association information and identifies application server identification information associated with application identification information identifying an application corresponding to the installation screen (step S17). Then, downloading of an application is requested to an application server 3 identified by the application server identification information identified in step S17 (step S18) and the application is downloaded from the application server 3 (step S19). Then, control to install the application downloaded in step S19 into the MFP 1 is performed (step S20).

As described above, the MFP 1 of the present embodiment acquires, from the web server 2, an app store in which an installation command is associated with each application which can be provided and displays the app store. Then, based on an installation command associated with an application selected by the user (authenticated user) (which command is installation command attached to the pressed installation button 5), the MFP 1 generates an installation screen identified by the installation screen information associated with the second user information identifying the user and displays the installation screen. Accordingly, it is possible to switch an installation screen according to a user (in a form suitable to user).

Second Embodiment

Figure 13:
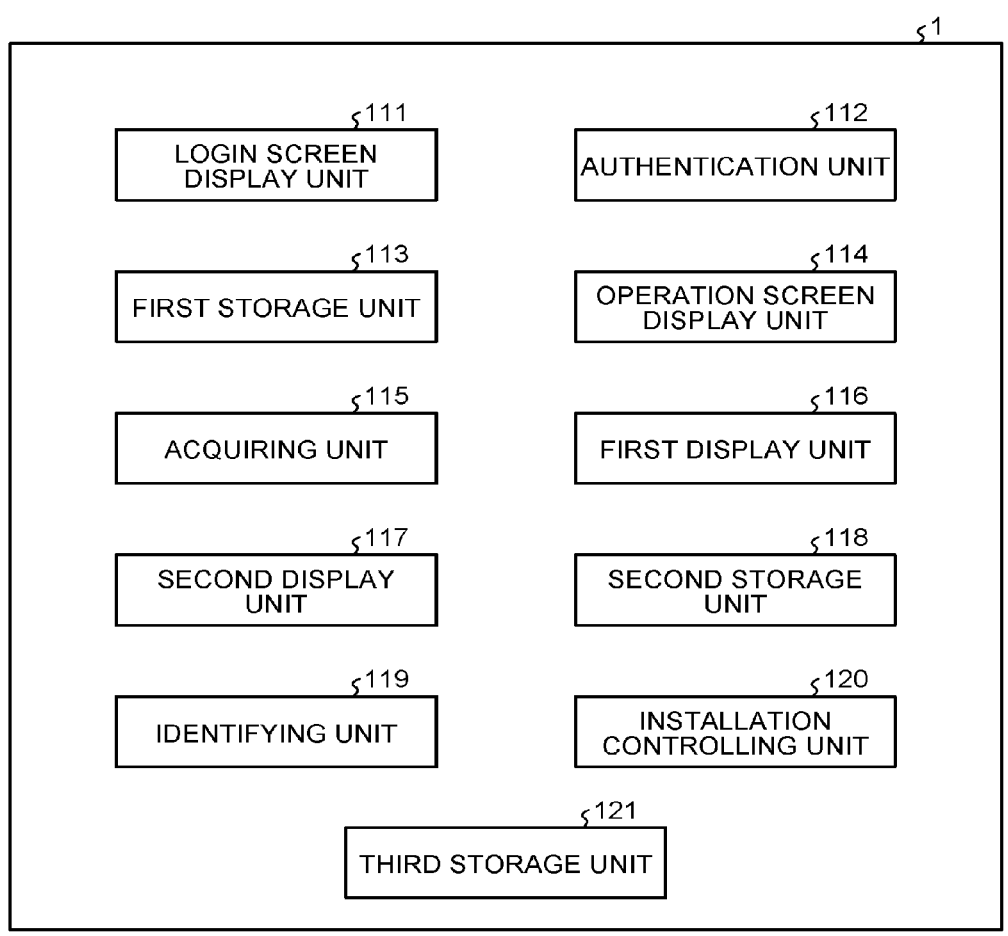
FIG. 13 is a view illustrating an example of a functional configuration of an MFP of a second embodiment.

Next, the second embodiment will be described. A description of a part common to the above-described first embodiment is appropriately omitted. FIG. 13 is a view illustrating an example of a functional configuration of an MFP 1 of the present embodiment. As illustrated in FIG. 13, the MFP 1 further includes a third storage unit 121. The third storage unit 121 stores first destination information indicating a country or region where the MFP 1 is used ("used" is a concept including "sold").

Figures 14, 15:
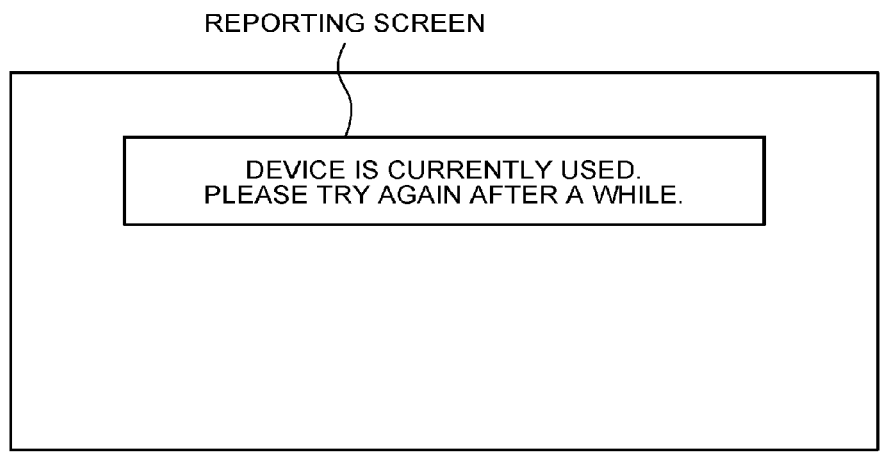
FIG. 14 is a view illustrating an example of second association information of the second embodiment.
FIG. 15 is a view illustrating an example of a reporting screen.

Also, in the present embodiment, second association information stored in a second storage unit 118 is information in which application server identification information is associated with each combination of application identification information and first destination information. FIG. 14 is a view illustrating an example of the second association information in the present embodiment. In FIG. 14, "JP" indicates Japan, "US" indicates the United States, and "CN" indicates China. When receiving an instruction to install an application through an installation screen (in this example, when the above-described installation execution button 6 is pushed), an identifying unit 119 refers to the second association information and identifies application server identification information associated with a combination of application identification information, which identifies the application, and first destination information stored in the third storage unit 121. The other configurations are similar to those of the above-described first embodiment. According to the present embodiment, the MFP 1 can be connected to an application server 3 suitable to a country or region where the MFP 1 is used.

Third Embodiment

Next, the third embodiment will be described. A description of a part common to the above-described first embodiment is appropriately omitted. In the present embodiment, a second display unit 117 of an MFP 1 displays a reporting screen indicating that control to install an application cannot be executed when the MFP 1 is in a state in which the control to install the application cannot be executed exclusively (state in which processing speed of CPU, memory capacity, or the like (resource) necessary for control to install the application cannot be secured). FIG. 15 is a view illustrating an example of the reporting screen.

Figure 16:
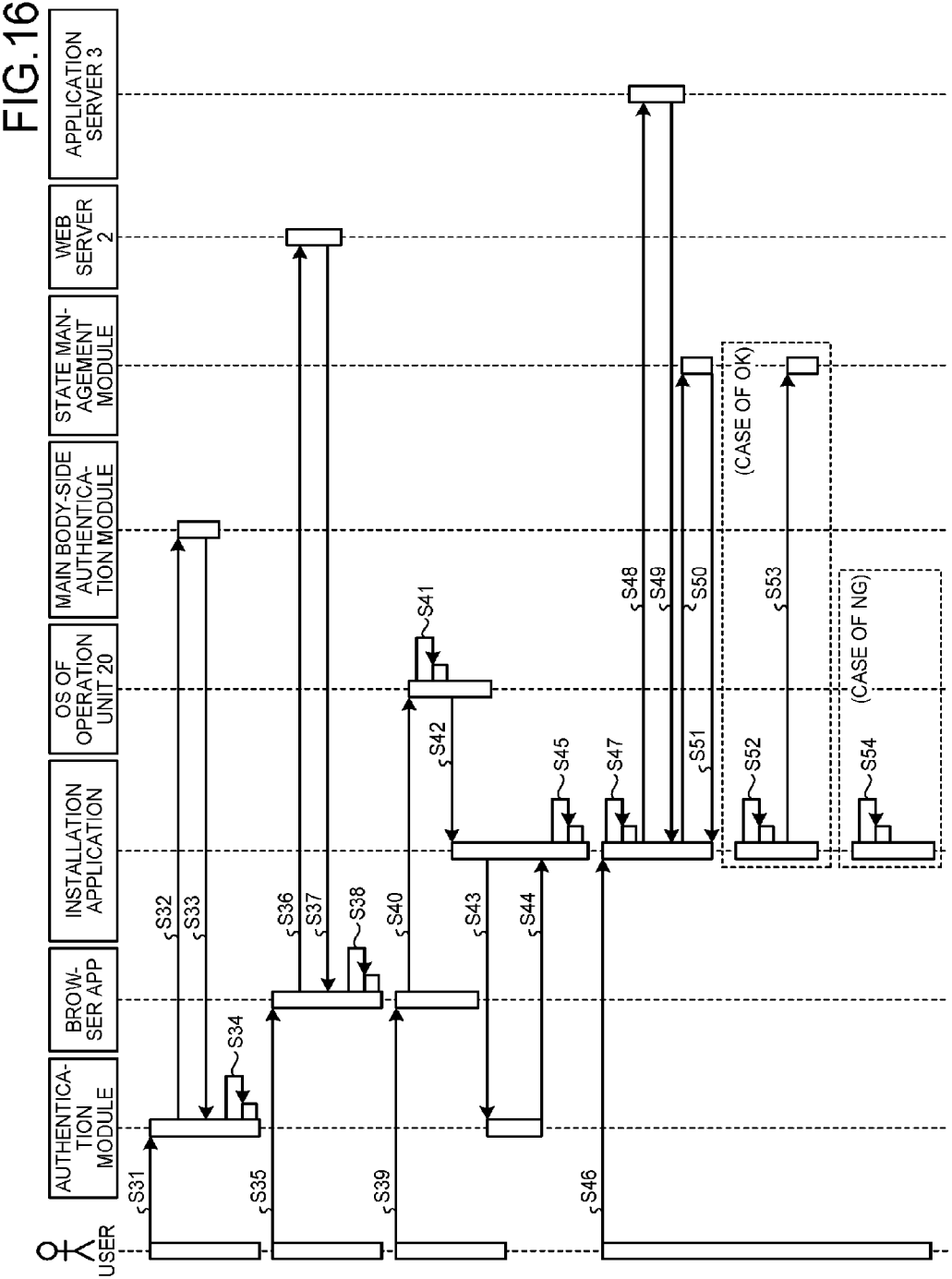
FIG. 16 is a sequence diagram illustrating an example of an operation procedure of an information processing system of a third embodiment.

FIG. 16 is a sequence diagram illustrating an example of an operation procedure of an information processing system 100 of the present embodiment. Since contents of processing in step S31 to step S49 illustrated in FIG. 16 are similar to contents of processing in step S1 to step S19 illustrated in FIG. 12, a detailed description thereof is omitted. After step S49, when the MFP 1 is in a state in which a resource of the MFP 1 can be used exclusively (hereinafter, may be referred to as "app-offline"), an installation application requests a state management module managing a state of a main body 10 to keep the app-offline until installation control is completed (step S50). The state management module, which receives the request, checks a state of the MFP 1 and makes notification, which corresponds to a result of the checking, to the installation application (step S51). For example, when the MFP 1 is in a state of the app-offline, the state management module makes a notification, which indicates that the request is permitted, to the installation application and performs control to keep the app-offline. On the other hand, for example, when the MFP 1 is executing different processing and is not in the state of the app-offline, notification indicating that the request is not permitted is made to the installation application. In the following, processing in each of a case where the request from the installation application is permitted (case of "OK") and a case where the request is not permitted (case of "NG") will be described.

First, the case where the request from the installation application is permitted will be described as an example. In this case, the installation application performs control to install an application downloaded in step S49 into the MFP 1 (step S52). Then, when the installation is completed, the state management module is notified of the completion (step S53). The state management module, which receives the notification, performs control to release the app-offline.

Next, the case where the request from the installation application is not permitted will be described as an example. In this case, the installation application displays the reporting screen, which indicates that control to install the application cannot be executed, onto the operation panel 27 (step S54). For example, a reporting screen on which a text "A device is currently used. Please try again after a while." may be displayed onto the operation panel 27.

Similarly to the above-described first embodiment, an installation screen is controlled in the MFP 1 and a screen in which a state of the MFP 1 is taken into consideration can be displayed in the present embodiment.

Fourth Embodiment

Figure 17:
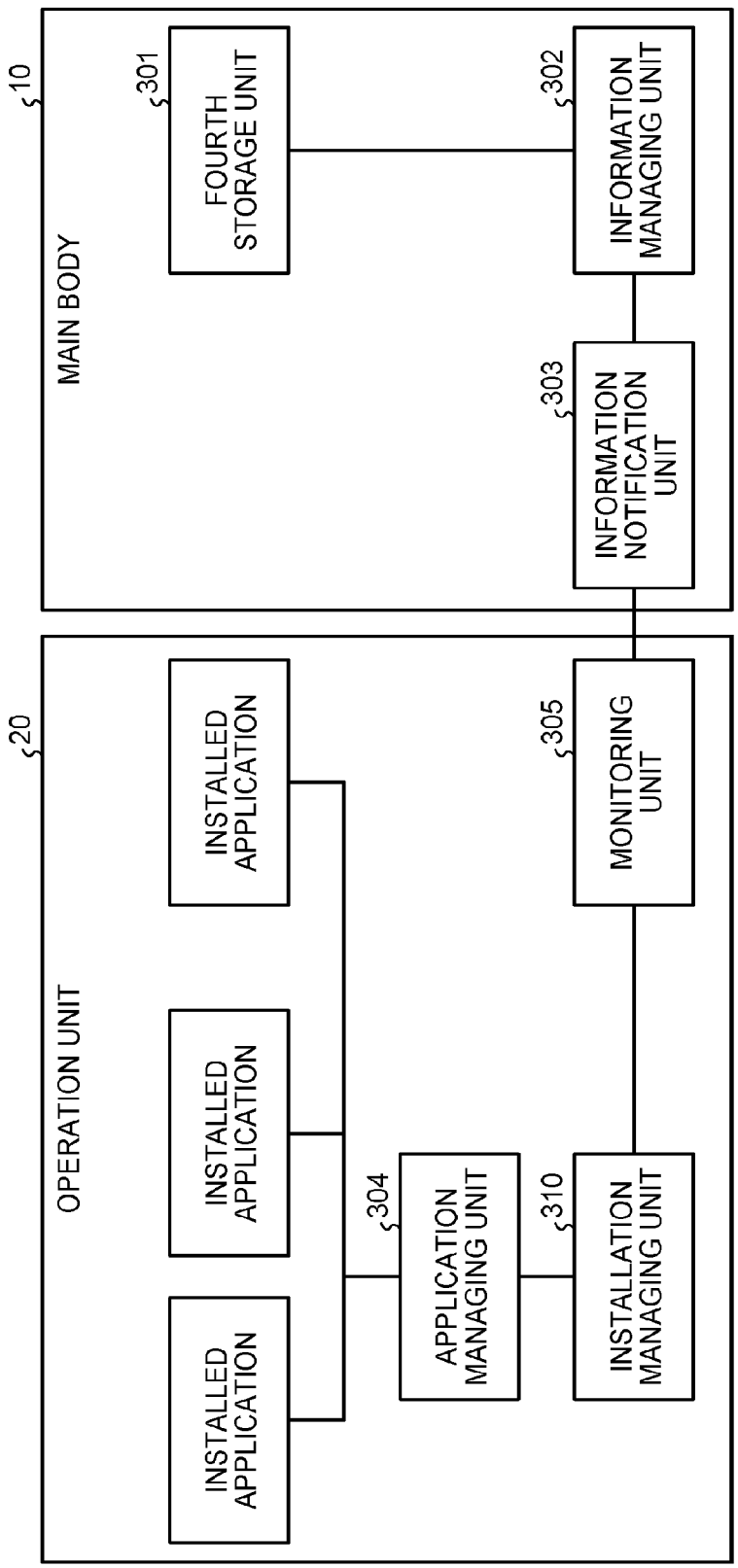
FIG. 17 is a view illustrating an example of a function included in an MFP of a fourth embodiment.

Next, the fourth embodiment will be described. A description of a part common to each of the above-described embodiments is appropriately omitted. FIG. 17 is a view illustrating an example of a function included in an MFP 1 of the present embodiment.

In the example in FIG. 17, a main body 10 includes a fourth storage unit 301, an information managing unit 302, and an information notification unit 303. The fourth storage unit 301 stores various kinds of information such as a model name of the MFP 1 and first destination information indicating a country or region where the MFP 1 is used (including sales or the like).

The information managing unit 302 manages information stored in the fourth storage unit 301. For example, the information managing unit 302 can perform setting of information stored in the fourth storage unit 301 according to operation by a user (such as a manager having authority to perform various kinds of setting).

The information notification unit 303 notifies an operation unit 20 of information in the main body 10. In this example, the information notification unit 303 notifies the operation unit 20 of first destination information, which is previously stored in the fourth storage unit 301, upon activation of the main body 10 in initial activation of the MFP 1.

In the example in FIG. 17, the operation unit 20 includes an application managing unit 304, a monitoring unit 305, and an installation managing unit 310. The application managing unit 304 manages an application which is already installed in the MFP 1 (in the operation unit 20 in this example). In this example, the application managing unit 304 holds application information indicating one or more applications which are already installed in the current MFP 1.

The monitoring unit 305 monitors the information from the main body 10 and transmits the information in the notification from the main body 10 (such as first destination information) to the installation managing unit 310.

The installation managing unit 310 controls execution of installation/uninstallation of an application and transmits a command to execute installation/uninstallation to the application managing unit 304 when execution of the installation/uninstallation is necessary. In this example, the application managing unit 304 holds third association information in which at least second destination information indicating one or more countries or regions is associated with each of the plurality of applications, as a condition to determine installation or uninstallation of that application. In this example, the third association information is information in which at least the second destination information indicating one or more countries or regions is associated with each of the plurality of applications, as a condition to uninstall that application from the MFP 1, but it is not limited thereto. For example, the third association information may be information in which at least the second destination information indicating one or more countries or regions is associated with each of groups each consisting of a plurality of applications, as a condition to install that application from the MFP 1. Note that uninstallation of an application from the MFP 1 means deleting an installed application or restoring a state of the MFP 1 to a state before the applications being installed into the MFP 1.

Figures 18, 19:
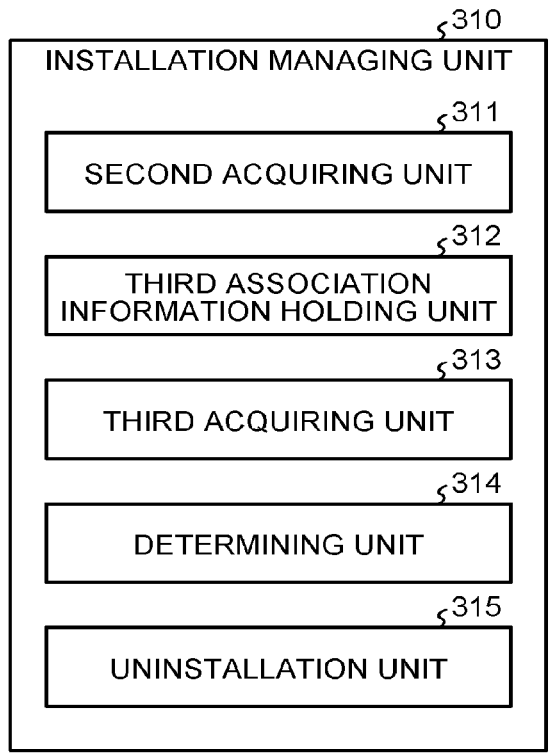
FIG. 18 is a view illustrating an example of third association information.
FIG. 19 is a view illustrating an example of a function included in an installation managing unit of the fourth embodiment.

FIG. 18 is a view illustrating an example of the third association information in the present embodiment. In the example in FIG. 18, information indicating "JP (Japan)" is described as second destination information corresponding to an app name "application 1." This means that a condition to uninstall an application indicated by the app name "application 1" is satisfied when the MFP 1 is used in JP.

Also, in the example in FIG. 18, information indicating "US (United States)" is described as second destination information corresponding to an app name "application 2". This means that a condition to uninstall an application indicated by the app name "application 2" is satisfied when the MFP 1 is used in US. In this example, third association information is described in a format, such as an XML format, which can be interpreted by software, but it is not limited thereto.

FIG. 19 is a view illustrating an example of a function included in the installation managing unit 310. As illustrated in FIG. 19, the installation managing unit 310 includes a second acquiring unit 311, a third association information holding unit 312, a third acquiring unit 313, a determining unit 314, and an uninstallation unit 315. For convenience of description, in FIG. 19, a function according to the present invention is mainly illustrated. However, a function included in the MFP 1 is not limited to these.

The second acquiring unit 311 acquires first destination information indicating a country or region where the MFP 1 is used ("used" is a concept including "sold"). In this example, the second acquiring unit 311 acquires the first destination information in the notification from the main body 10 through the monitoring unit 305.

The third association information holding unit 312 holds the above-described third association information. The third acquiring unit 313 acquires application information indicating an application which is already installed in the current MFP 1. In this example, the third acquiring unit 313 acquires application information from the application managing unit 304.

The determining unit 314 determines an application to be uninstalled from the MFP 1 based on the above-described third association information and the first destination information acquired by the second acquiring unit 311. In the present embodiment, the determining unit 314 determines, as the application to be uninstalled from the MFP 1, an application associated with second destination information matching the first destination information acquired by the second acquiring unit 311 among a plurality of applications included in the above-described third association information. For example, a case where the third association information is in a form in FIG. 18 and where a country or region indicated by the first destination information acquired by the second acquiring unit 311 is "JP" is considered. In this case, the determining unit 314 determines, as the application to be uninstalled from the MFP 1, an application associated with the second destination information indicating "JP" (application indicated by app name "application 1" in this example) among the plurality of applications included in the third association information illustrated in FIG. 18.

The uninstallation unit 315 performs control to uninstall the application determined by the determining unit 314 from the MFP 1. In the present embodiment, the uninstallation unit 315 identifies an application identical to the application determined by the determining unit 314 among one or more applications indicated by the application information acquired by the third acquiring unit 313. Then, an instruction (command) is given to the application managing unit 304 to uninstall the identified application from the MFP 1. The application managing unit 304, which receives this instruction, uninstalls the application identified by the uninstallation unit 315 from the MFP 1. Then, the uninstalled application is deleted from the application information.

In such a manner, when whole processing to uninstall the application, for which a condition to uninstall is satisfied, among the applications which are already installed in the MFP 1 is completed, information indicating that "initial activation is completed" is recorded into a memory of the operation unit 20. In and after second activation, the above processing is not performed as long as the information indicating that "initial activation is completed" is recorded in the memory of the operation unit 20.

Figure 20:
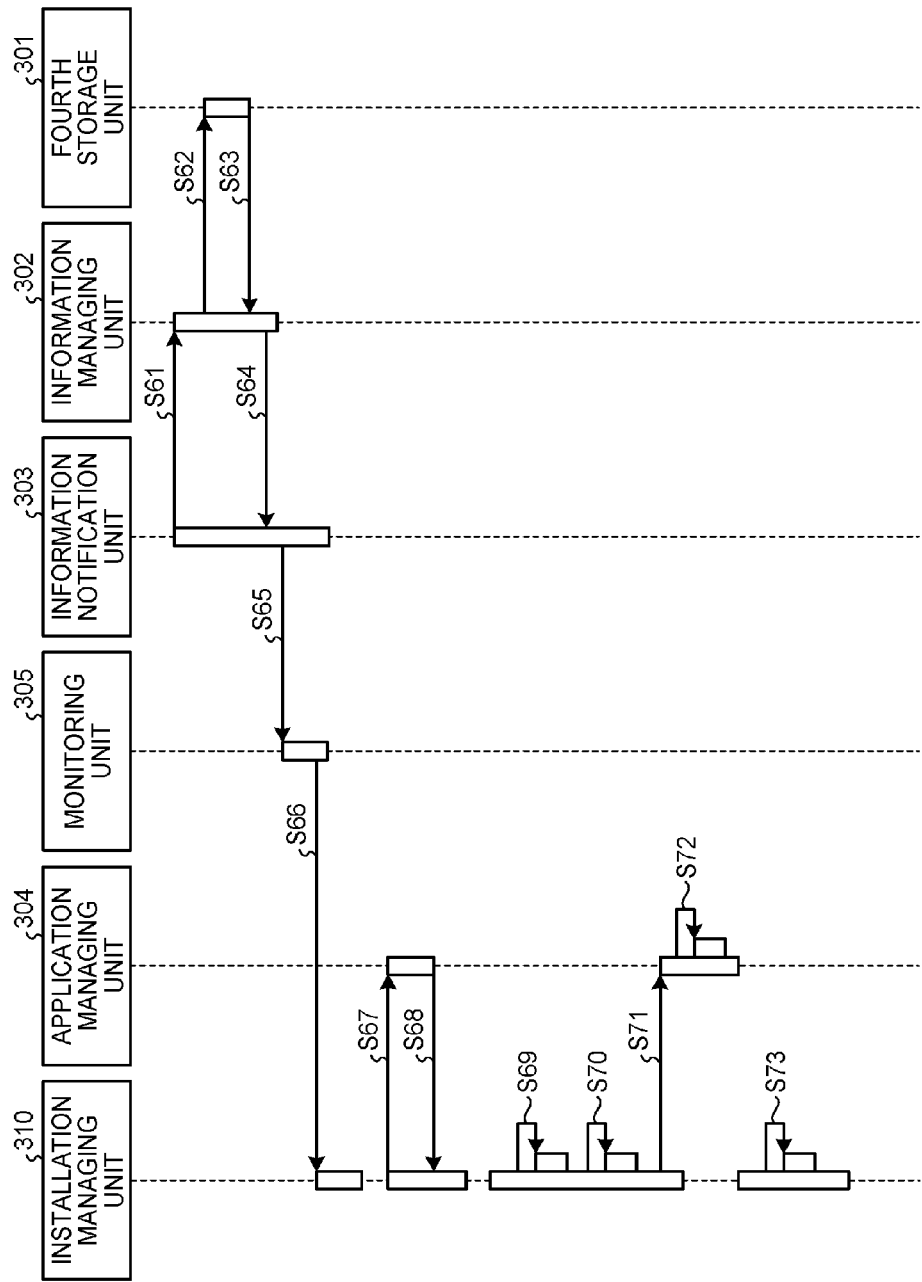
FIG. 20 is a sequence diagram illustrating an example of an operation procedure of the MFP of the fourth embodiment.

FIG. 20 is a sequence diagram illustrating an example of an operation procedure in initial activation of the MFP 1 of the present embodiment. First, the information notification unit 303 requests first destination information from the information managing unit 302 upon activation of the main body 10 in the initial activation of the MFP 1 (step S61). The information managing unit 302, which receives this request, requests first destination information from the fourth storage unit 301 (step S62) and acquires the first destination information as the response (step S63). Then, the first destination information acquired from the fourth storage unit 301 is transmitted to the information notification unit 303 (step S64).

The information notification unit 303 notifies the operation unit 20 of the first destination information acquired from the information managing unit 302 (step S65). The monitoring unit 305, which receives this notification, notifies the installation managing unit 310 of the first destination information in the notification from the information notification unit 303 (step S66). Accordingly, the installation managing unit 310 (second acquiring unit 311) acquires the first destination information.

Then, the installation managing unit 310 checks whether the information indicating that "initial activation is completed" is recorded in the memory of the operation unit 20. Here, since this example is in a case of the initial activation, the information indicating that "initial activation is completed" is not recorded. Processing in this case is in the following. The installation managing unit 310 (third acquiring unit 313) requests the above-described application information from the application managing unit 304 (step S67) and acquires the application information as the response (step S68). Next, the installation managing unit 310 (determining unit 314) determines, as an application to be uninstalled from the MFP 1, an application associated with second destination information matching the first destination information acquired in step S66 among a plurality of applications included in the above-described third association information (step S69). Detailed contents of this have been described in the above.

Next, the installation managing unit 310 (uninstallation unit 315) identifies an application identical to the application determined in step S69 among one or more applications indicated by the application information acquired in step S68 (step S70). Next, the installation managing unit 310 (uninstallation unit 315) instructs the application managing unit 304 to uninstall the application identified in step S70 from the MFP 1 (step S71). The application managing unit 304 which receives this instruction uninstalls the application identified by the installation managing unit 310 (uninstallation unit 315) from the MFP 1 among applications which are already installed in the MFP 1 (step S72).

Then, the installation managing unit 310 records the information indicating that "initial activation is completed" into the memory of the operation unit 20 (step S73). In and after second activation, processing in step S67 to step S73 described above is not performed as long as the information indicating that "initial activation is completed" is recorded in the memory of the operation unit 20.

As described above, in the present embodiment, third association information in which second destination information indicating one or more countries or regions is associated with each of the plurality of applications, as a condition to determine installation or uninstallation of that application is held. Then, based on the above-described third association information and the first destination information indicating a country or region where the MFP 1 is used, an application to be uninstalled from the MFP 1 is determined and the determined application (more specifically, application identical to determined application among one or more applications which are already installed in MFP 1) is uninstalled from the MFP 1. Accordingly, it is possible to automatically uninstall, from the MFP 1, an application which is not necessary in a country or region where the MFP 1 is used.

First Modification Example of Fourth Embodiment

In the above-described fourth embodiment, there is a problem that it is not possible to deal with a case where the above-described first destination information is changed after initial activation. In the present modification example, the above problem is solved by execution of uninstallation corresponding to the above-described first destination information at arbitrary timing according to an instruction from a serviceman with authority to change setting of the above-described first destination information. In this example, after setting of first destination information stored in a fourth storage unit 301 is changed, the serviceman can perform operation to instruct execution of uninstallation.

Here, a case where a predetermined application is uninstalled according to the above-described first destination information and the predetermined application is completely deleted from the MFP 1 is considered. In this case, there is a problem that the predetermined application cannot be recovered even when the above-described first destination information is changed and a condition to install the predetermined application is satisfied. Thus, in the present modification example, an uninstalled application is not deleted from an MFP 1 and is held in a state in which re-installation thereof can be performed (that is, uninstalled application is left in MFP 1), whereby the above problem is solved.

That is, the above-described uninstallation unit 315 performs control to uninstall an application determined by a determining unit 314 from the MFP 1 and also performs control to hold the application, on the MFP 1, in a state in which re-installation thereof can be performed. Further, in this example, the application managing unit 304 holds second application information indicating one or more applications uninstalled from the MFP 1 in addition to the above-described application information.

Figure 21:
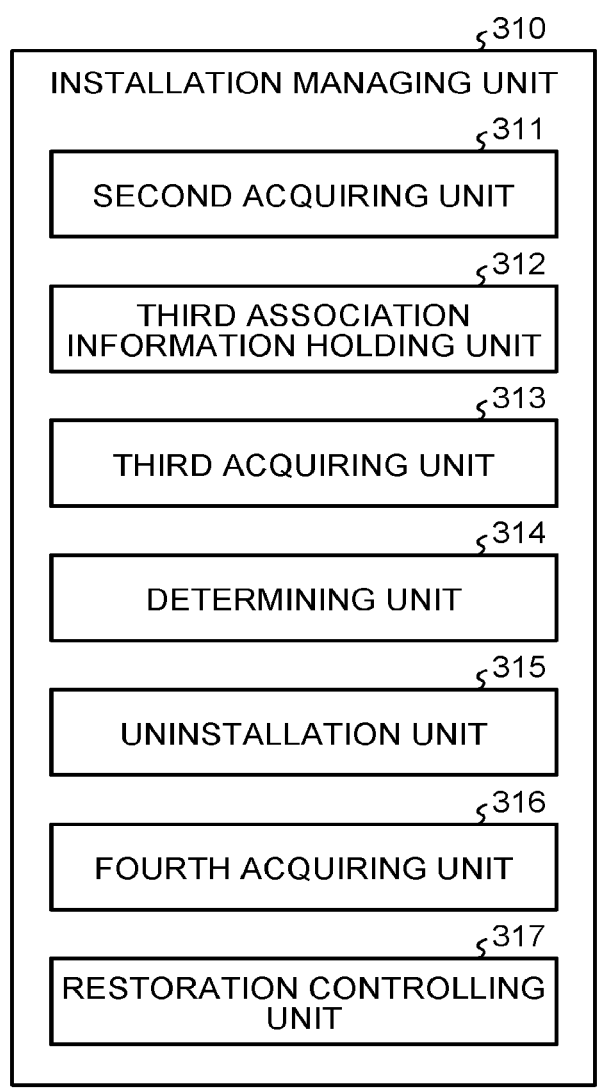
FIG. 21 is a view illustrating an example of a function included in an installation managing unit of a modification example.

FIG. 21 is a view illustrating an example of a function included in an installation managing unit 310 of the present modification example. As illustrated in FIG. 21, the installation managing unit 310 further includes a fourth acquiring unit 316 and a restoration controlling unit 317. The fourth acquiring unit 316 acquires the above-described second application information.

When there is an application which is not identical to the application determined by the determining unit 314 among one or more applications indicated by the second application information acquired by the fourth acquiring unit 316 (one or more applications uninstalled from MFP 1), that is, when there is an application an uninstallation condition of which is not satisfied (in other words, installation condition thereof is satisfied), the restoration controlling unit 317 performs control to reinstall (recover) the application.

Figure 22:
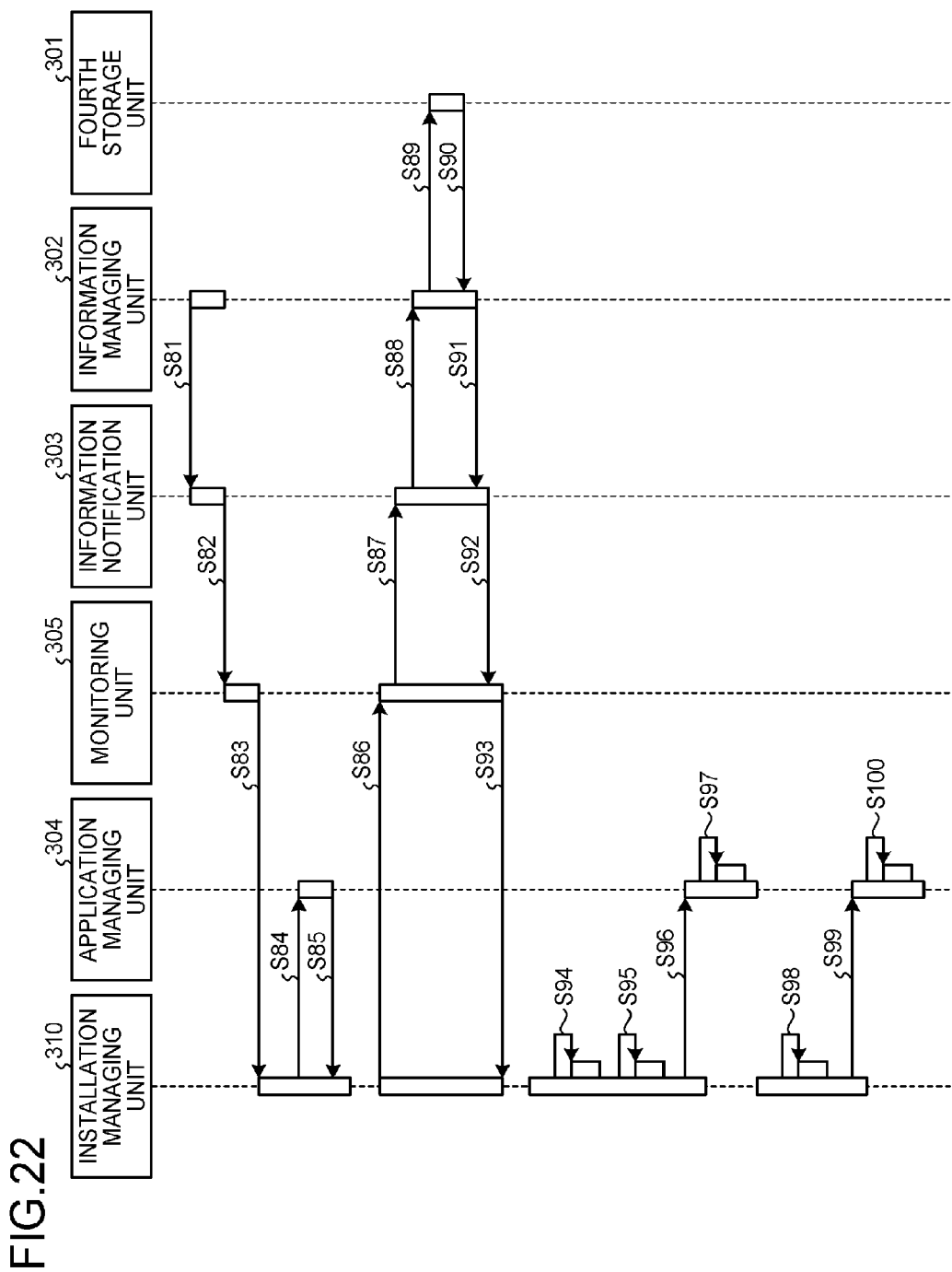
FIG. 22 is a sequence diagram illustrating an example of an operation procedure of an MFP of the modification example.

FIG. 22 is a sequence diagram illustrating an example of an operation procedure of the MFP 1 in a case where operation to instruct execution of uninstallation is performed after a serviceman changes setting of first destination information stored in the fourth storage unit 301. When receiving operation to instruct execution of uninstallation, an information managing unit 302 instructs an information notification unit 303 to transmit, to an operation unit 20, information instructing to execute the uninstallation (for convenience of description, referred to as "execution instruction information") (step S81). The information notification unit 303, which receives this instruction, notifies the operation unit 20 of the execution instruction information (step S82). A monitoring unit 305, which receives this notification, notifies the installation managing unit 310 of the execution instruction information in the notification from the information notification unit 303 (step S83). The installation managing unit 310 (third acquiring unit 313) which receives this notification requests the above-described application information from the application managing unit 304 (step S84) and acquires the above-described application information as the response (step S85). Also, here, the installation managing unit 310 (fourth acquiring unit 316) requests the above-described second application information from the application managing unit 304 (step S84) and acquires the above-described second application information as the response (step S85).

Next, the installation managing unit 310 (second acquiring unit 311) instructs the monitoring unit 305 to transmit (notify), to the main body 10, information (for convenience of description, referred to as "destination request") requesting the above-described first destination information (step S86). The monitoring unit 305, which receives this instruction, transmits the destination request to the main body 10 (step S87). The information notification unit 303 of the main body 10 which receives the destination request notifies the information managing unit 302 of the received destination request (step S88). After checking the destination request in the notification, the information managing unit 302 requests first destination information (latest first destination information after setting thereof is changed by serviceman) from the fourth storage unit 301 (step S89) and acquires the first destination information as the response (step S90). The information managing unit 302 instructs the information notification unit 303 to transmit the first destination information acquired in step S90 to the operation unit 20 (step S91). The information notification unit 303, which receives this instruction, transmits the first destination information to the operation unit 20 (step S92).

When receiving the first destination information as a response to the destination request, the monitoring unit 305 of the operation unit 20 notifies the installation managing unit 310 (second acquiring unit 311) of the received first destination information (step S93). Accordingly, the installation managing unit 310 (second acquiring unit 311) acquires the first destination information.

Next, the installation managing unit 310 (determining unit 314) determines, as an application to be uninstalled from the MFP 1, an application associated with second destination information matching the first destination information acquired in step S93 (application uninstallation condition of which is satisfied) among a plurality of applications included in the above-described third association information (step S94). Next, the installation managing unit 310 (restoration controlling unit 317) checks whether there is an application, which is not identical to the application determined in step S94, (application which does not satisfy uninstallation condition) among one or more applications indicated by the second application information acquired in step S85 (one or more applications uninstalled from MFP 1) (step S95).

Here, a case where a result of step S95 is affirmative is described as an example. In this case, the installation managing unit 310 (restoration controlling unit 317) identifies an application which is not identical to the application determined in step S94 among one or more applications indicated by the second application information acquired in step S85 and instructs the application managing unit 304 to reinstall the identified application (step S96). The application managing unit 304 which receives this instruction re-installs the application identified by the installation managing unit 310 (restoration controlling unit 317) among the one or more applications indicated by the above-described second application information (one or more applications which are uninstalled from MFP 1 and are held in state in which re-installation thereof can be performed) (step S97). Then, the re-installed application is deleted from the above-described second application information and the above-described second application information is updated. Note that when a result of step S95 described above is negative, the processing in step S96 and step S97 described above is not performed and processing transitions to step S98 described later.

Next, the installation managing unit 310 (uninstallation unit 315) identifies an application identical to the application determined in step S94 among one or more applications indicated by the application information acquired in step S85 (step S98). Next, the installation managing unit 310 (uninstallation unit 315) instructs the application managing unit 304 to uninstall the application identified in step S98 from the MFP 1 and to hold the application, on the MFP 1, in a state in which re-installation thereof can be performed (step S99). The application managing unit 304 which receives this instruction uninstalls, from the MFP 1, the application identified by the installation managing unit 310 (uninstallation unit 315) among an application which is already installed in the MFP 1. Also, the application managing unit 304 holds the application, in the memory of the operation unit 20, in a state in which re-installation thereof can be performed (step S100). Here, while deleting the application, which is uninstalled in step S100, from the above-described application information, the application managing unit 304 adds the application to the above-described second application information.

Second Modification Example of Fourth Embodiment

Figure 23:
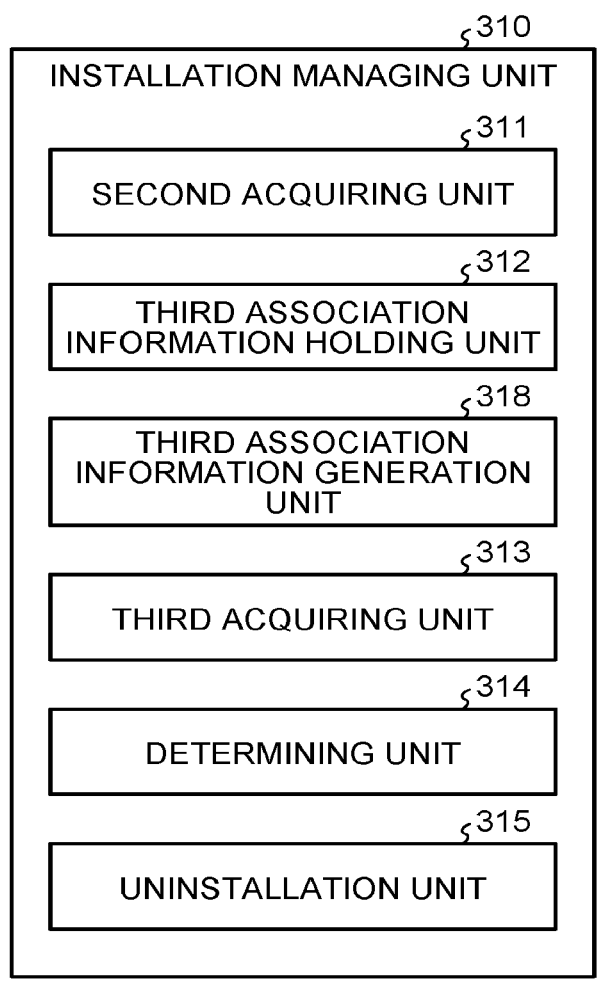
FIG. 23 is a view illustrating an example of a function included in an installation managing unit of the modification example.

For example, each of one or more applications which are already installed in an MFP 1 may include, as a condition to determine installation or uninstallation of that application, condition information at least including second destination information indicating one or more countries or regions. For example, as illustrated in FIG. 23, in this form, an installation managing unit 310 includes a third association information generation unit 318. The third association information generation unit 318 can acquire condition information from each of one or more applications, which are already installed in the MFP 1, and can generate third association information in which the condition information is associated with each of the one or more applications which are already installed in the MFP 1.

That is, third association information in which at least second destination information indicating one or more countries or regions is associated with each of the plurality of applications, as a condition to determine installation or uninstallation of that application may be previously held in the MFP 1 or may be generated in a manner of the present modification example.

Figure 24:
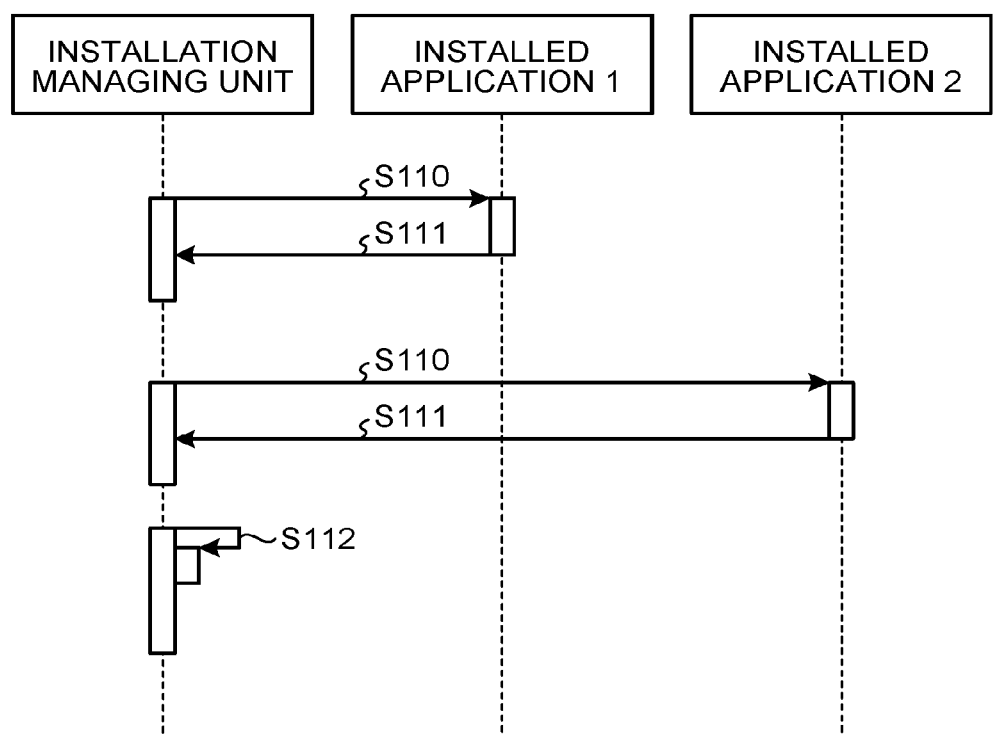
FIG. 24 is a sequence diagram illustrating an example of an operation procedure of the MFP of the modification example.

FIG. 24 is a sequence diagram illustrating an example of an operation procedure of the MFP 1 of when the third association information is generated. Here, a case where the installation managing unit 310 (third association information generation unit 318) generates the third association information during activation of the MFP 1 is described as an example, but it is not limited thereto and timing of generating the third association information can be arbitrarily changed.

In the example in FIG. 24, a case where there are an application 1 and an application 2 as applications which are already installed in the MFP 1 is considered. First, the installation managing unit 310 (third association information generation unit 318) requests the above-described condition information from each of the application 1 and the application 2 upon activation of an operation unit 20 in the activation of the MFP 1 (step S110) and acquires the condition information as the response (step S111). Next, the installation managing unit 310 (third association information generation unit 318) generates third association information in which the condition information is associated with each of the application 1 and the application 2, by using the condition information acquired from each of the application 1 and the application 2 (step S112). Then, the installation managing unit 310 (third association information generation unit 318) makes the above-described third association information holding unit 312 hold the third association information generated in step S112.

In the above, embodiments according to the present invention have been described. However, the present invention is not limited to each of the above-described embodiments. In a practical phase, the present invention can be realized with a modification of an element within the spirit and the scope thereof. Also, it is possible to form various inventions by an arbitrary combination of a plurality of elements disclosed in each of the above-described embodiments. For example, a several elements may be removed from all elements indicated in each embodiment. Also, elements in different embodiments can be arbitrarily combined.

Note that a function of each of the units in the above-described MFP 1 (which units are the login screen display unit 111, the authentication unit 112, the operation screen display unit 114, the acquiring unit 115, first display unit 116, the second display unit 117, the identifying unit 119, the installation controlling unit 120, the information managing unit 302, the information notification unit 303, the monitoring unit 305, the application managing unit 304, and the installation managing unit 310) is realized when a CPU (11 or 21) executes a program stored in a storage device (such as ROM 12, HDD 14, ROM 22, or flash memory 24), but it is not limited thereto. For example, at least a part of the function of each unit in the above-described MFP 1 may be realized by a special hardware circuit (such as semiconductor integrated circuit). Also, each of a first storage unit 113, a second storage unit 118, a third storage unit 121, and a fourth storage unit 301 of the above-described MFP 1 can be realized, for example, by a ROM 12, an HDD 14, a ROM 22, or a flash memory 24 (including combination of these).

Also, in each of the above-described embodiments, a main body 10 and an operation unit 20 are operated independently by different operating systems, but it is not limited thereto. For example, the main body 10 and the operation unit 20 may be operated by the same operating system.

Also, a program executed by an information processing system 100 (such as MFP 1, web server 2, or application server 3) of each of the above-described embodiments may be recorded, as a file in an installable format or in an executable format, into a computer-readable recording medium such as a CD-ROM, a flexible disk (FD), a CD-R, a digital versatile disk (DVD), or a universal serial bus (USB) when being provided. Alternatively, the program may be provided or distributed through a network such as the Internet. Also, various programs may be previously installed in a ROM or the like and provided.

According to an embodiment, it is possible to switch an installation screen according to a user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
processing circuitry
configured to compare, when receiving first user information used for authentication processing of determining whether a user has authority to use the information processing device, the first user information with second user information identifying users having the authority to use the information processing device, and execute the authentication processing;
a first memory storing first association information in which installation screen information identifying an installation screen for installation of an application is associated with each piece of the second user information;
wherein the processing circuitry is further configured to acquire an application list screen in which a command to display an installation screen is associated with each application, and the information processing device further includes
a first display configured to display the application list screen; and
a second display configured to generate, based on a command associated with an application selected by a user among each application displayed on the application list screen, an installation screen identified by installation screen information associated in the first memory with the second user information identifying the user that selected the application, and display the installation screen;
wherein the second display displays a reporting screen indicating that control to install an application cannot be executed when the information processing device is in a state in which the control to install the application cannot be executed exclusively.

2. The information processing device according to claim 1, wherein the authentication processing is processing of determining that a user who inputs the first user information has authority to use the information processing device when the first user information matches the second user information, and of determining that a user who inputs the first user information does not have authority to use the information processing device when the first user information does not match the second user information.

3. The information processing device according to claim 1, further comprising:
a second memory storing second association information in which with each piece of application identification information identifying an application is stored in association with application server identification information identifying an application server holding that application, wherein the processing circuitry is further configured to
identify, when receiving, through the installation screen, an instruction to install an application, application server identification information associated with application identification information identifying that application, based on the second association information; and perform, with the application server identified by the application server identification information, control to install the application held in the application server.

4. The information processing device according to claim 3, further comprising a third memory storing first destination information indicating a country or region where the information processing device is used, wherein the second association information is information in which application server identification information is associated with each combination of application identification information and the first destination information, and when receiving, through the installation screen, the instruction to install the application, the processing circuitry is configured to identify application server identification information associated with a combination of the application identification information identifying the application and the first destination information stored in the third memory.

5. The information processing device according to claim 1, wherein the processing circuitry is further configured to acquire first destination information indicating a country or region where the information processing device is used, determine an application to be uninstalled from the information processing device based on third association information in which at least second destination information indicating one or more countries or regions is associated with each of a plurality of applications, as a condition for determining installation or uninstallation of that application, and the acquired first destination information, and perform control to uninstall the determined application from the information processing device.

6. The information processing device of claim 1, wherein the second display is configured to display the installation screen associated with the user, the installation screen including a selectable input allowing the user to execute installation of the application.

7. An information processing system comprising an information processing device and a server, wherein the server includes at least a memory to hold an application list screen in which a command to display an installation screen for installation of each application is associated with that application, and the information processing device includes:

processing circuitry configured to compare, when receiving first user information used for authentication processing of determining whether a user has authority to use the information processing device, the first user information with second user information identifying users having the authority to use the information processing device, and to execute the authentication processing;

a first memory storing first association information in which installation screen information identifying an installation screen is associated with each piece of the second user information, wherein the processing circuitry is further configured to acquire the application list screen from the server, the information processing device further including a first display configured to display the application list screen; and a second display configured to generate, based on a command associated with an application selected by a user among one or more applications displayed on the application list screen, an installation screen identified by installation screen information associated in the first memory with the second user information identifying the user that selected the application, and display the installation screen;

wherein the second display displays a reporting screen indicating that control to install an application cannot be executed when the information procession device is in a state in which the control to install the application cannot be executed exclusively.

8. An information processing method, comprising:

authenticating including comparing, when receiving first user information used for authentication processing of determining whether a user has authority to use an information processing device, the first user information with second user information identifying users having the authority to use the information processing device, and executing the authentication processing;

acquiring an application list screen in which a command to display an installation screen for installation of each application is associated with that application;

displaying the application list screen; and displaying, including generating, based on a command associated with an application selected by a user among one or more applications displayed on the application list screen, an installation screen identified by installation screen information associated with second user information identifying the user that selected the application among installation screen information included in first association information in which installation screen information identifying an installation screen is associated with each piece of the second user information, and displaying the installation screen;

wherein displaying includes a reporting screen indicating that control to install an application cannot be executed when the information processing device is in a state in which the control to install the application cannot be executed exclusively.

* * * * *